March 1, 1932. R. V. SEAHOLM ET AL 1,847,139
SIGN CHANGING DEVICE
Filed May 31, 1930 4 Sheets-Sheet 1

Rudolph V. Seaholm
Ferdinand H. H. Foss, INVENTORS.
BY
ATTORNEYS

March 1, 1932.  R. V. SEAHOLM ET AL  1,847,139
SIGN CHANGING DEVICE
Filed May 31, 1930  4 Sheets-Sheet 2
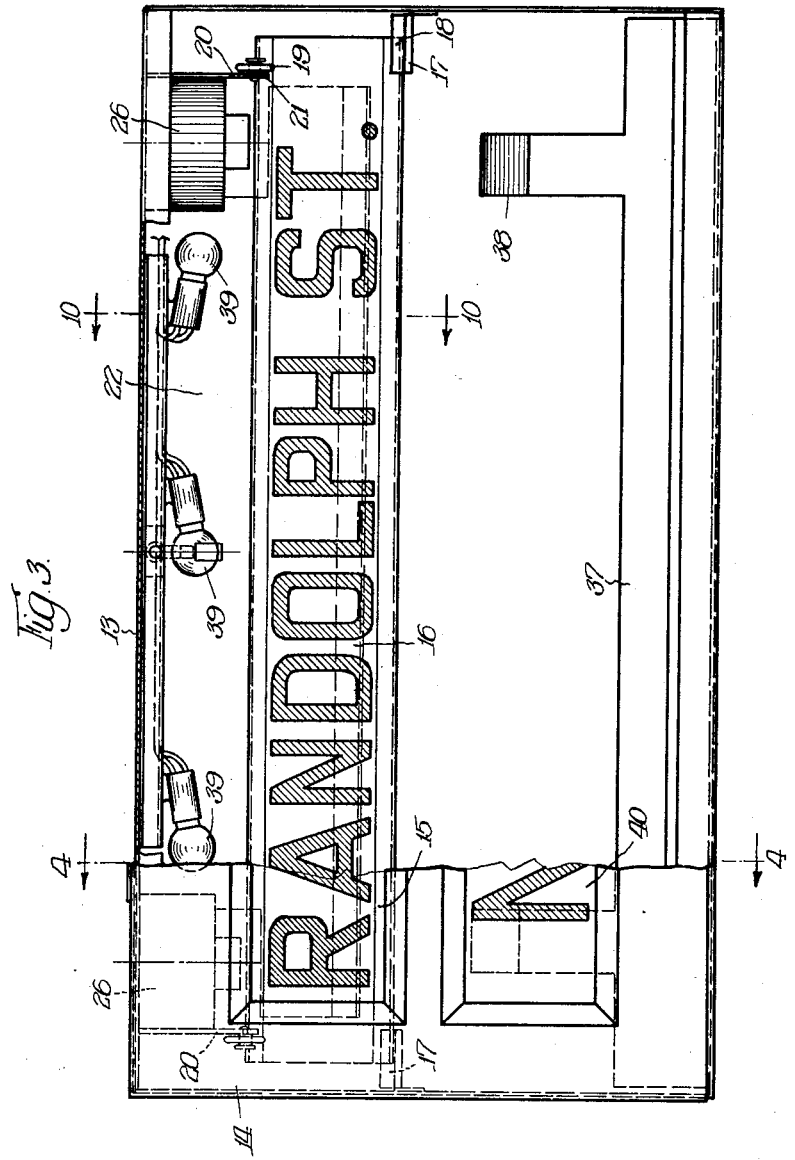

March 1, 1932.  R. V. SEAHOLM ET AL  1,847,139
SIGN CHANGING DEVICE
Filed May 31, 1930  4 Sheets-Sheet 3
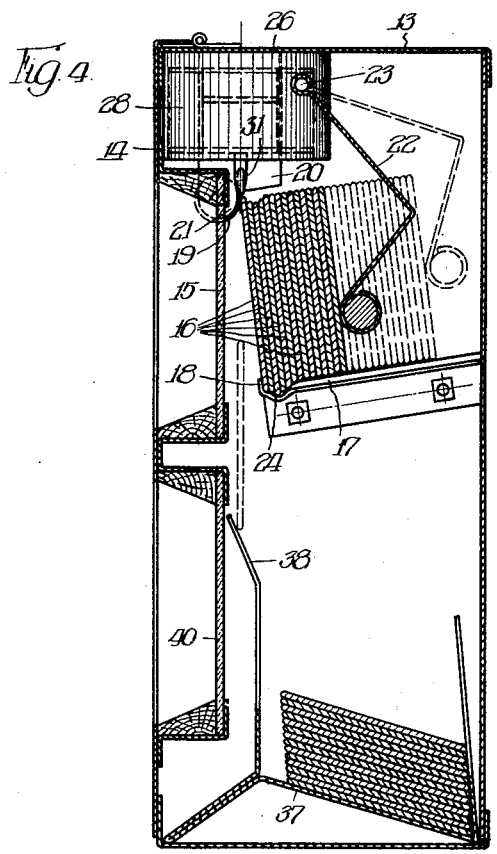
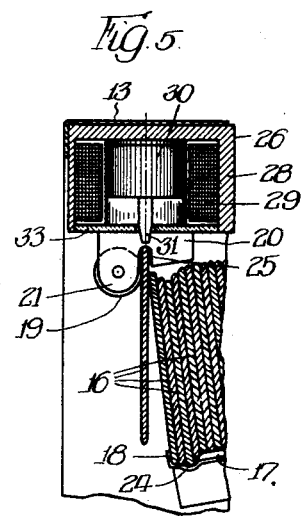
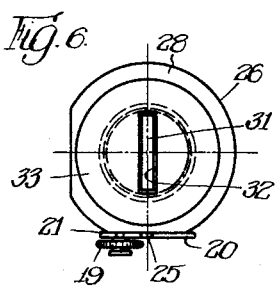
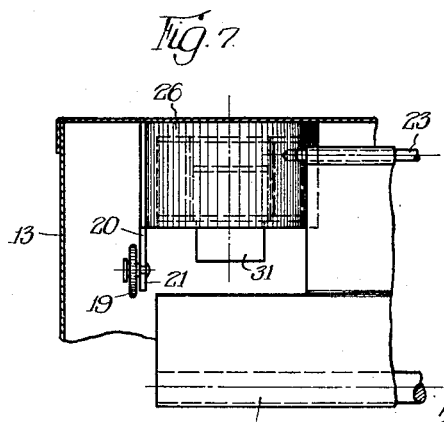
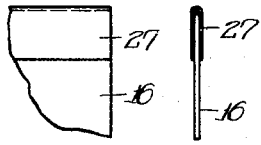
Rudolph V. Seaholm
Ferdinand W. W. Foss INVENTORS.
BY
ATTORNEYS March 1, 1932.    R. V. SEAHOLM ET AL    1,847,139
SIGN CHANGING DEVICE
Filed May 31, 1930    4 Sheets-Sheet 4

Rudolph V. Seaholm
Ferdinand W. H. Foss INVENTORS.

BY Cromwell, Greist & Warden
ATTORNEYS

Patented Mar. 1, 1932

1,847,139

UNITED STATES PATENT OFFICE

RUDOLPH V. SEAHOLM AND FERDINAND H. H. FOSS, OF CHICAGO, ILLINOIS

SIGN CHANGING DEVICE

Application filed May 31, 1930. Serial No. 457,807.

This invention has to do with a novel sign-changing device which is capable of being used in a great many different ways. For example, it may be used quite effectively as a combined station-indicating and advertisement-displaying device in a passenger vehicle, as hereinafter more fully set forth.

The principal object of the invention is to provide an improved sign-changing device which is simple in construction, light in weight, compact in form and dependable in operation.

Another important object of the invention is to provide means in such a device for changing the signs by a direct application of power thereto in the form of a fluent medium, such as magnetism or air under abnormal pressure, thereby eliminating the necessity of any intermediate power-transmitting mechanism.

Other objects of the invention will be apparent to those skilled in the art upon a full understanding of the construction, arrangement and operation of the improved device.

Two slightly different embodiments of the invention are presented herein for the purpose of exemplification, but it will of course be appreciated that the invention is capable of incorporation in other structurally modified forms coming equally within the contemplated scope of the appended claims.

In the accompanying drawings:

Fig. 3 is a front view of the device, with part of the door broken away to show the interior;

Fig. 4 is a vertical section through the device, taken on the line 4—4 of Fig. 3;

Fig. 5 is a fragmentary section, taken through the center of one of the magnets, showing the magnet energized and the front card lifted into its highest position;

Fig. 6 is a bottom view of one of the magnets;

Fig. 7 is a fragmentary rear view of one of the magnets, showing the manner in which the follower is pivoted to the shell of the magnet;

Fig. 8 is a fragmentary face view of one of the cards;

Fig. 9 is a fragmentary edge view of one of the cards;

Figure 1:
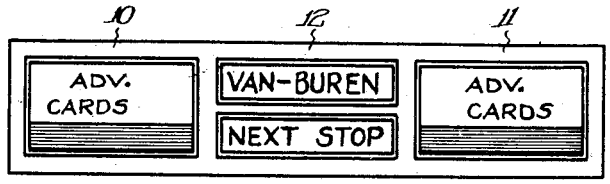
Fig. 1 is a front view of a device constructed in accordance with the invention.
Figure 2:
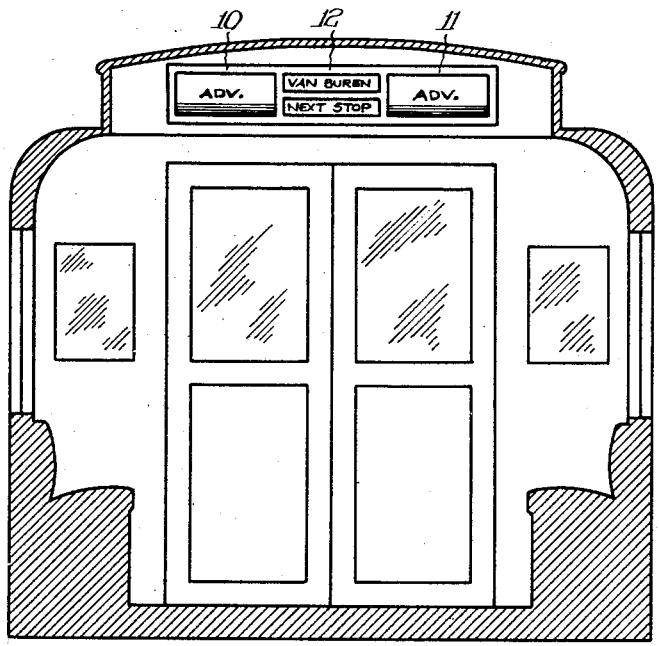
Fig. 2 is a vertical section through a car, showing the device positioned above one of the end doorways.

In the drawings, a three-unit device constructed in accordance with the invention is shown installed in the end of a railway car. The two side units 10 and 11 are used to change cards bearing advertisements or notices, while the center unit 12, which is similar in construction and operation to the side units, is used to change cards bearing the names of the stations at which the car makes stops. Since all of the units are substantially the same, only the center station-indicating unit will be described.

The unit 12 is housed within a rectangular casing 13. The casing, which is clearly shown in Figs. 3 and 4, is provided with a front door 14 which contains a glass covered window 15 in the upper portion thereof through which the foremost one of a series of stacked cards 16 is always visible to the occupants of the car. The cards to be displayed are arranged on edge in a stack and rest adjacent their ends upon two guides 17 which are attached to the ends of the casing near the level of the lower edge of the window. The lower edge of the foremost card presses forwardly against two upturned lips 18 which are formed on the front ends of the guides 17, and the upper edge of the same card presses forwardly against two anti-friction rollers 19 which are rotatably mounted on two guides 20 above the guides 17 in slightly projecting relation to two downwardly extending portions 21 on the front ends of the guides 20. The rear edges of the rollers 19 on the upper guides are set forwardly a little with respect to the rear edges of the lips 18 on the lower guides, causing the cards to tilt forwardly to a certain extent.

The cards 16 are held together in the stack and pressed forwardly against the upper and lower guides by a weighted follower 22 of L-shaped cross-section which is positioned behind the stack and is pivoted above the same on a rod 23 for engagement with the rearmost card in the stack. The lower guides 17 are inclined a little toward the front and are provided with shallow depressions 24 into which two or three of the cards immediately behind the foremost one settle for a purpose hereinafter explained. The upper guides 20 are spaced slightly above the upper edges of the cards and are provided with narrow upwardly extending notches 25 even with the rear edges of the rollers into which the upper edge of the foremost card is adapted to be drawn when the latter is being removed from its position on the guides 17.

The removal of the foremost card 16 is effected at the desired time by two magnets 26 which are attached to the top of the casing adjacent the ends of the latter in positions directly above the upper edge of the foremost card. The cards are all preferably made of cardboard or other light material and are provided along their upper edges with strips 27 of magnetic metal. The construction of the strips is shown in detail in Figs. 8 and 9. The magnets 26 consist of heavy cup-shaped shells 28 of magnetic metal which contain hollow wire field coils 29. The coils 29 loosely surround heavy soft iron cores 30 which are shiftable vertically in the coils. The cores 30 are provided with relatively small wedge-shaped noses 31 which project downwardly through slots 32 in disks 33 into positions about $\frac{1}{32}$ inch above the upper edge of the foremost card when the magnets are at rest. The disks 33 are made of non-magnetic material. The upper faces of the cores 30 are covered with non-magnetic disks 34 which keep the cores from sticking to the upper closed ends of the shells 28.

Figure 13:
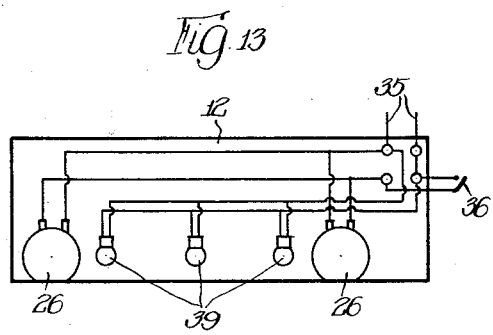
Fig. 13 is a wiring diagram for the electrically operated form of the device.

The magnets 26 are connected together in an electrical circuit 35, as shown diagrammatically in Fig. 13, and are energized simultaneously when the circuit is closed by a normally open spring-pressed switch 36, which switch may be located either near the unit or at a remote point, such as in the motorman's compartment in either the same or a connected car. The switch 36, instead of being designed for manual operation, may be located outside of the car and operated automatically by contact members located at suitable points along the track.

When the magnets 26 are energized, the lower ends of the cores 30 magnetically attract the strip 27 on the upper edge of the foremost card and move upwardly, carrying the card with them into the position shown in Fig. 5, in which position the upper edge of the card is in the notches 25 of the upper guides, the lower edge of the card is above the level of the upturned lips 18 on the lower guides and the card is in a vertical position against the rollers 19. As the foremost card assumes the elevated position just described, the second card is moved forwardly by the pressure exerted thereon by the follower 22 into the position shown in Fig. 5, in which position the lower edge of the card is against the lips 18 on the lower guides and the upper edge is resting lightly against the rear face of the foremost card at a point about opposite the rollers 19.

When the magnets 26 are now de-energized—which ordinarily occurs the instant after they are energized—the cores 30 drop under their own weight and drive the foremost card downwardly with a sharp hammer-like blow, whereupon what was formerly the foremost card drops into receiving rack 37 in the lower portion of the casing and what was formerly the second card becomes the foremost one and tilts forwardly a little until the upper edge thereof is arrested by the rollers 19.

The rack 37, which is removably positioned in the bottom of the casing, is of generally U-shaped cross-section and is provided with an inclined portion 38 which serves to deflect the lower edges of the falling cards rearwardly and cause the released cards to accumulate in the rack in a neat stack, face downwardly, in the same order in which they are to be again placed on the guides 17 at the beginning of the next run.

From the foregoing description it will be understood that the foremost card is transferred from the upper stack to the lower stack every time that the switch 36 is closed.

The foremost card on the guides 17 is brightly illuminated by a plurality of concealed electric lamps 39 which are located in the casing above the glass covered window 15. The lamps 39 render the foremost card quite conspicuous and easy to read through the window. A frosted glass panel 40, which is similar in shape and appearance to the window 15, is positioned below the latter in the front door of the casing and has printed thereon an appropriate legend, such as "Next stop".

Figure 10:
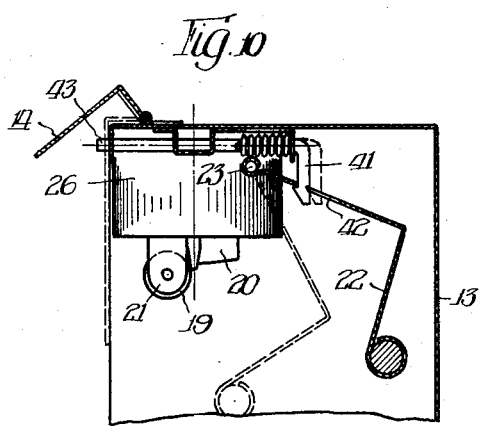
Fig. 10 is a fragmentary section through the device, taken on the line 10—10 of Fig. 3, showing the follower latch in operative position.

When the cards are being placed in a stack on the guides 17, the follower 22 may be pushed back and held temporarily in an out-of-the-way position by a forwardly spring-pressed latch 41 which extends downwardly through a slot 42 in the upper portion of the follower and engages with one edge of the slot, as shown in Fig. 10. The latch 41 is provided with a forwardly extending portion 43 which projects beyond the front face of the casing 13 into the path of the door 14. When the door 14 is lowered into its closed position after the cards have been properly arranged on the guides 17, it engages with the projecting portion 43 of the latch and shifts the same rearwardly, thereby rendering the latch inoperative and allowing the follower 22 to function.

Figure 11:
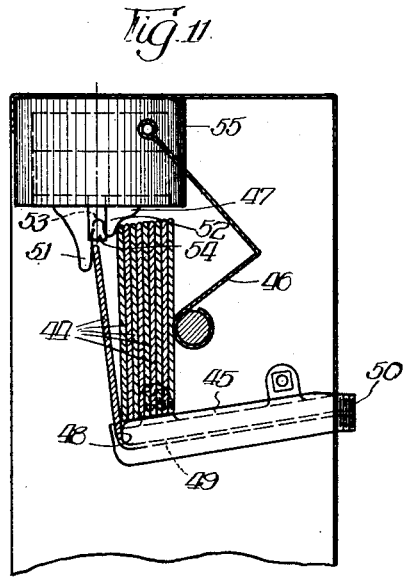
Fig. 11 is a fragmentary section, corresponding to the upper portion of Fig. 4, showing a modification in which the power for operation is compressed air instead of electricity.
Figure 12:
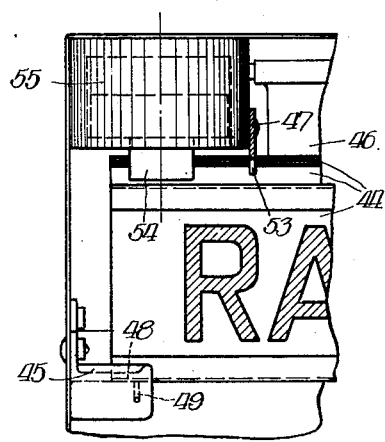
Fig. 12 is a partial front view of the modified device shown in Fig. 11, with the front door removed.

In Figs. 11 and 12 is shown a modified form of the invention wherein the magnets are dispensed with and the foremost card is removed from the stack by means of compressed air.

As is in the form of the invention first described, the cards 44 to be displayed are stacked on edge on two guides 45 in front of a follower 46, with the first few cards in the stack beneath two guides 47. The lower guides 45 are provided adjacent their front ends with narrow upwardly opening grooves 48 in which the lower edge of the foremost card seats. The bottoms of the grooves 48 connect with upwardly opening ducts 49 which are formed in the guides 45 and are connected at 50 to a supply of air under pressure through an intermediate control valve (not shown).

The foremost card is tilted forwardly a little, and the upper edge of the same rests against two rearwardly facing vertical shoulders 51 which are formed on the front ends of the upper guides 47. The second and remaining cards in the stack remain upright behind the foremost card, with the lower edge of the second card resting on the lower guides just rearwardly of the grooves 48 and with the upper edge of the second card resting against two rearwardly facing inclined shoulders 52 on the upper guides. The lower guides 45 slope downwardly a little toward the front of the casing. The upper guides 47 are provided in the plane of the shoulders 51 with two downwardly opening notches 53 into which the upper edge of the foremost card is adapted to move when the lower edge of the card is ejected from the grooves 48.

When the compressed air is turned on for an instant, the foremost card is blown upwardly out of the grooves 48 into the notches 53 and is dropped clear of the lower guides onto the rack in the bottom of the casing. As soon as the foremost card is removed, its position is taken by the next card, which slips down into the air grooves 48 under the pressure exerted indirectly thereon by the follower. The dropping of the foremost card may be expedited by the employment of two weighted hammers 54 which the card is required to raise when the upper edge thereof is movd upwardly into the notches 53. The hammers 54 are shiftable vertically in tubular guideways 55 which are attached to the top of the casing adjacent the ends thereof.

When the sign changing device of the invention is used as a combined station-indicating and advertisement-displaying device, the two or more units employed may be, and preferably are, electrically connected together for simultaneous operation.

We claim:

1. In a sign-changing device, the combination with a series of signs, of a guide on which the signs are supported in upright positions, and means coacting with the upper edge only of the foremost sign for first raising such sign to clear the front end of the guide and then releasing such sign to allow the same to move downwardly in front of the guide into a position below the latter.

2. In a sign-changing device, the combination with a series of signs, of upper and lower guides between which the signs are supported in upright positions, and means coacting with the upper edge only of the foremost sign for first raising such sign into a position against the upper guide to clear the front end of the lower guide and then releasing such sign to allow the same to drop downwardly in front of the lower guide into a position below the latter.

3. In a sign-changing device, the combination with a series of signs, of means for supporting the signs against each other in upright positions, means for preventing straight forward movement of the foremost sign, means coacting with the upper edge only of the foremost sign for jogging such sign past said last mentioned means into a position free of said first mentioned means, and means for simultaneously causing the next sign to move forwardly into the position previously occupied by the foremost sign.

4. In a sign-changing device, the combination with a series of signs, of means for supporting the signs against each other in upright positions, an abutment against which the lower edge of the foremost sign bears, another abutment against which the upper edge of the foremost sign bears, and means engageable with the upper edge only of the foremost sign for elevating such sign far enough to permit the lower edge of the same to swing forwardly over the lower abutment and drop into a position beneath the latter.

5. In a sign-changing device, the combination with a series of signs, of means for supporting the signs in upright positions in a stack, and means for removing the foremost sign by the direct application thereto of a fluent power-transmitting medium.

6. In a sign-changing device, the combination with a series of signs, of means for supporting the signs in upright positions in a stack, and means for removing the foremost sign by the direct application thereto of magnetic force.

7. In a sign-changing device, the combination with a series of signs, of means for supporting the signs in upright positions in a stack, and means for removing the foremost sign by the direct application thereto of air under abnormal pressure.

8. In a sign-changing device, the combination with a series of signs, of means for supporting the signs in upright positions in a stack, and means for removing the foremost sign by the direct application thereto of compressed air.

9. In a sign-changing device, the combination with a series of signs having portions of magnetic material, of means for supporting the signs in upright positions in a group, a stationary magnet field, a shiftable core in the field close proximity to one edge of the foremost sign, and means for energizing the field to cause the core to attract the foremost sign and disengage it from said supporting means.

10. In a sign-changing device, the combination with a series of signs, of a lower guide on which the signs rest in upright positions, an upper guide above the signs, a rearwardly facing abutment adjacent the front end of the lower guide against which the lower edge of the foremost sign bears, a rearwardly facing abutment adjacent the front end of the upper guide against which the upper edge of the foremost sign bears, means coacting with the upper edge only of the foremost sign for first shifting such sign upwardly behind the upper abutment far enough for the lower edge of the sign to clear the lower abutment and then discharging the sign downwardly, and means for simultaneously causing the next sign to move into the position previously occupied by the foremost sign.

11. In a sign-changing device, the combination with a series of signs, of a lower guide on which the signs are supported, an abutment at the front end of the lower guide against which the lower edge of the foremost sign is positioned, an upper guide having a downwardly opening notch therein, and means for momentarily shifting the foremost sign upwardly into the notch to allow the lower edge of the sign to clear the abutment and move forwardly into a position free of the lower guide.

12. In a sign-changing device, the combination with a series of signs, of a lower guide on which the signs are supported, an abutment at the front end of the lower guide against which the lower edge of the foremost sign is positioned, an upper guide having a downwardly opening notch therein, means for momentarily shifting the foremost sign upwardly into the notch to allow the lower edge of the sign to clear the abutment and move forwardly into a position free of the lower guide, and means for ejecting the upper edge of the sign from the notch.

13. In a sign-changing device, the combination with a series of signs, of a lower guide on which the signs are supported, an abutment at the front end of the lower guide against which the lower edge of the foremost sign is positioned, an upper guide having a downwardly opening notch therein, means for momentarily shifting the foremost sign upwardly into the notch to allow the lower edge of the sign to clear the abutment and move forwardly into a position free of the lower guide, and a weighted plunger for ejecting the upper edge of the sign from the notch.

14. The method of displaying and changing a number of signs, which consists in placing the signs against each other in upright positions, preventing the foremost sign from falling forward, applying pressure to the rearmost sign to keep the signs together, and removing the foremost sign by the direct application thereto of a fluent power-transmitting medium.

In testimony whereof we have hereunto subscribed our names.

RUDOLPH V. SEAHOLM.
FERDINAND H. H. FOSS.